(12) United States Patent
Martini et al.

(10) Patent No.: US 11,518,076 B2
(45) Date of Patent: Dec. 6, 2022

(54) MOLDING APPARATUS CONFIGURED TO INJECTION MOLD AN OPENING DEVICE ON A SHEET OF PACKAGING MATERIAL

(71) Applicant: TETRA LAVAL HOLDINGS & FINANCE S.A., Pully (CH)

(72) Inventors: Pietro Martini, Parma (IT); Francesca Tavoni, Modena (IT); Giulio Bertani, Carpi (IT); Maurizio Filippini, Modena (IT)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 70 days.

(21) Appl. No.: 17/048,892

(22) PCT Filed: May 28, 2019

(86) PCT No.: PCT/EP2019/063836
§ 371 (c)(1),
(2) Date: Oct. 19, 2020

(87) PCT Pub. No.: WO2019/238415
PCT Pub. Date: Dec. 19, 2019

(65) Prior Publication Data
US 2021/0237325 A1 Aug. 5, 2021

(30) Foreign Application Priority Data

Jun. 12, 2018 (EP) .................................. 18177177

(51) Int. Cl.
*B29C 45/33* (2006.01)
*B29C 45/14* (2006.01)
*B29L 31/00* (2006.01)

(52) U.S. Cl.
CPC ........ *B29C 45/33* (2013.01); *B29C 45/14344* (2013.01); *B29C 45/14065* (2013.01);
(Continued)

(58) Field of Classification Search
CPC .............. B29C 45/33; B29C 45/14344; B29C 45/14065; B29C 45/44; B29C 2045/445
See application file for complete search history.

(56) References Cited

U.S. PATENT DOCUMENTS 3,437,227 A * 4/1969 Peyser ................. B65D 17/508
D9/438
3,499,572 A * 3/1970 Ruekberg ............ B29C 45/0081
220/270
(Continued)

FOREIGN PATENT DOCUMENTS

EP 0949992 A1 10/1999

OTHER PUBLICATIONS

International Search Report (PCT/ISA/210) dated Jun. 21, 2019, by the European Patent Office as the International Searching Authority for International Application No. PCT/EP2019/063836.
(Continued)

*Primary Examiner* — Edmund H Lee
(74) *Attorney, Agent, or Firm* — Buchanan Ingersoll & Rooney PC

(57) ABSTRACT

A molding apparatus that injection molds an opening device on a packaging material sheet includes first and second molding units to injection mold a wall portion of the opening device on the sheet; the first molding unit comprising first and second molding elements configured to cooperate in contact to delimit at least part of a mold cavity fillable with molten material for forming a pull-member of the opening device; the mold cavity being delimited at least by first and second surfaces defined by the first and second molding elements respectively; a third molding unit cooperable with the first and second molding elements to delimit the mold cavity, and defining a third surface, facing the first and second surfaces and delimiting, together with these latter, (Continued)

the mold cavity; the third surface is shaped to be equidistant from the first and second surfaces when the first and second molding elements cooperate.

15 Claims, 6 Drawing Sheets

(52) U.S. Cl.
CPC .............. *B29C 2045/14139* (2013.01); *B29L 2031/7166* (2013.01)

(56) References Cited

U.S. PATENT DOCUMENTS

| | | | |
|---|---|---|---|
| 6,303,066 B1 * | 10/2001 | Gustafsson | ....... B29C 45/14344 264/274 |
| 6,835,342 B2 * | 12/2004 | Gustafsson | ............. B29C 45/33 264/274 |
| 2016/0325878 A1 | 11/2016 | Björk et al. | |

OTHER PUBLICATIONS

Written Opinion (PCT/ISA/237) dated Jun. 21, 2019, by the European Patent Office as the International Searching Authority for International Application No. PCT/EP2019/063836.

* cited by examiner

MOLDING APPARATUS CONFIGURED TO INJECTION MOLD AN OPENING DEVICE ON A SHEET OF PACKAGING MATERIAL

TECHNICAL FIELD

The present invention relates to a molding apparatus configured to injection mold an opening device on a sheet of packaging material adapted for packing pourable products, preferably pourable food products.

BACKGROUND ART

As it is generally known, many pourable food products, such as fruit juice, UHT (ultra-high temperature-treated) milk, wine, tomato sauce, etc., are sold in packages made of sterilized packaging material.

A typical example is the parallelepiped-shaped package for pourable food products known as Tetra Brik Aseptic (registered trademark), which is made by folding and sealing a laminated sheet of packaging material.

In particular, the packaging material has a multilayer structure substantially comprising a base layer for stiffness and strength, which may be made of fibrous material, e.g. paper or mineral-filled polypropylene material, and a number of lamination layers made of heat-seal plastic material, e.g. polyethylene films, covering both sides of the base layer.

In the case of aseptic packages for long-storage products, such as UHT milk or fruit juice, the packaging material also comprises a layer of gas-barrier material, e.g. aluminum foil or ethyl vinyl alcohol (EVOH) film, which is superimposed on a layer of heat-seal plastic material, and is in turn covered with another layer of heat-seal plastic material. This latter layer of plastic material forms the inner face of the package eventually contacting the pourable food product.

Packages of this sort are normally produced on fully automatic packaging machines, in which a continuous tube is formed from the sheet of packaging material.

Furthermore, the sheet of packaging material is sterilized in the packaging machine by applying a chemical sterilization agent, which is then removed after the sterilization is completed.

Subsequently, the sheet of packaging material is maintained in a closed, sterile environment and is folded and sealed longitudinally to form the tube.

In order to complete the forming operations, the tube is filled from above, by means of a pipe, with the pourable food product and is formed, sealed and subsequently cut along equally spaced transversal cross sections.

Pillow packs are obtained thereby, which present a longitudinal sealing band, a top transversal sealing band and a bottom transversal sealing band, and which are then folded mechanically to form respective finished substantially parallelepiped-shaped packages.

To open the packages described above, various solutions have been proposed, including opening devices made of plastic material, which, according to a widespread technology, are applied, by injection molding, directly on a so-called prelaminated hole, i.e. a hole formed in the packaging material through the base layer only and covered, by means of a lamination process, by the other lamination layers, including the layer of gas-barrier material.

In particular, the molten plastic material is injected, by means of a molding apparatus, onto a sheet cover portion of the prelaminated hole formed through the base layer and which is made of such lamination layers.

According to an alternative solution, such sheet cover portion may be defined by a patch attached to the packaging material to close a hole formed, in this case, through the full thickness of the packaging material.

Generally, the molten plastic material is injected onto a first side of the sheet cover portion (i.e. the side of the sheet cover portion eventually facing towards the inner environment of the package) in order to cover such prelaminated hole up to an annular peripheral portion thereof.

In this way, a plastic material confetti portion directly attached to the first side of the sheet cover portion is obtained.

Furthermore, the confetti portion defines, together with the sheet cover portion, a user-tearable portion of the package, adapted to be torn by the user in order to open the package.

According to the known technology, during molding the plastic material is forced to pierce the sheet cover portion at predetermined piercing areas (due to the injection pressure and the geometry of the molding apparatus used to form the opening device) in order to pass through the sheet cover portion and form:
  a pull-member, protruding from the second side of the sheet cover portion and adapted to be pulled by the user, so as to cause a tearing of the user-tearable portion and causing the package to open; and
  a pouring spout, also protruding from the second side of the sheet cover portion and configured to guide the pourable product exiting from the package, when this latter is emptied under the action of the user.

Pull-members are known, which have a substantially elongated shape, for example an oval or elliptical shape.

Typically, the above-described pull-member, pouring spout and confetti portion are integrally formed in one single injection molded piece by means of the above-mentioned molding apparatus.

For this purpose, molding apparatuses are known, which comprise a first molding unit and a second molding unit, arranged in use on opposite sides of the sheet of packaging material and movable, with respect to one other, along a first direction substantially orthogonal to the packaging material, between:
  an open configuration, in which the first molding unit and the second molding unit are spaced apart from one another along the first direction, allowing feed of the sheet of packaging material between them; and
  a closed configuration, in which the first molding unit and the second molding unit cooperate in contact with the sheet of packaging material, so as to delimit a first mold cavity adapted to be filled with the molten plastic material.

In particular, the first mold cavity is adapted to house the sheet cover portion and to be filled with the molten plastic material for forming the confetti portion and injection molding the latter on the first side of the sheet cover portion.

Furthermore, according to a known configuration, the first molding unit comprises a pair of semi-molds, which face one another, symmetrically with respect to the first direction, and are movable, along a second direction substantially parallel to the packaging material, between:
  an open position, in which the semi-molds are spaced apart from one another along the second direction; and
  a closed position, in which the semi-molds cooperate in contact, so as to delimit a number of further mold cavities also adapted to be filled with the molten plastic material.

In particular, the two semi-molds delimit, when being in the closed position, at least a second mold cavity, adapted to form the pull-member of the opening device, and a third mold cavity, adapted to form the pouring spout of the opening device.

Typically, once the molding operation has been completed, the first molding unit and the second molding unit move from the closed configuration to the open configuration and the two semi-molds move from the closed position to the open position.

In detail, the above-mentioned movements occur during unmolding, i.e. once the injection of the plastic material into the cavities is completed and the plastic material has cooled down enough so that the first molding unit, the second molding unit and the two semi-molds can be separated from the plastic material and the opening device can be removed from the molding apparatus.

In particular, the first molding unit, the second molding unit and the two semi-molds have to be moved away (detached and separated) from the plastic material without compromising the integrity and desired final shape of the latter.

Although providing a functionally valid method for injection molding an opening device on a sheet of packaging material, the known molding apparatuses are still open for further improvement, in particular as to further improve the unmolding operation and to minimize the unmolding time.

DISCLOSURE OF INVENTION

It is therefore an object of the present invention to provide a molding apparatus, which is designed to fulfill the above-mentioned need in a straightforward and low-cost manner.

This object is achieved by a molding apparatus as claimed in claim 1.

BRIEF DESCRIPTION OF THE DRAWINGS

A non-limiting embodiment of the present invention will be described by way of example with reference to the accompanying drawings, in which.

BEST MODE FOR CARRYING OUT THE INVENTION

Figure 1:
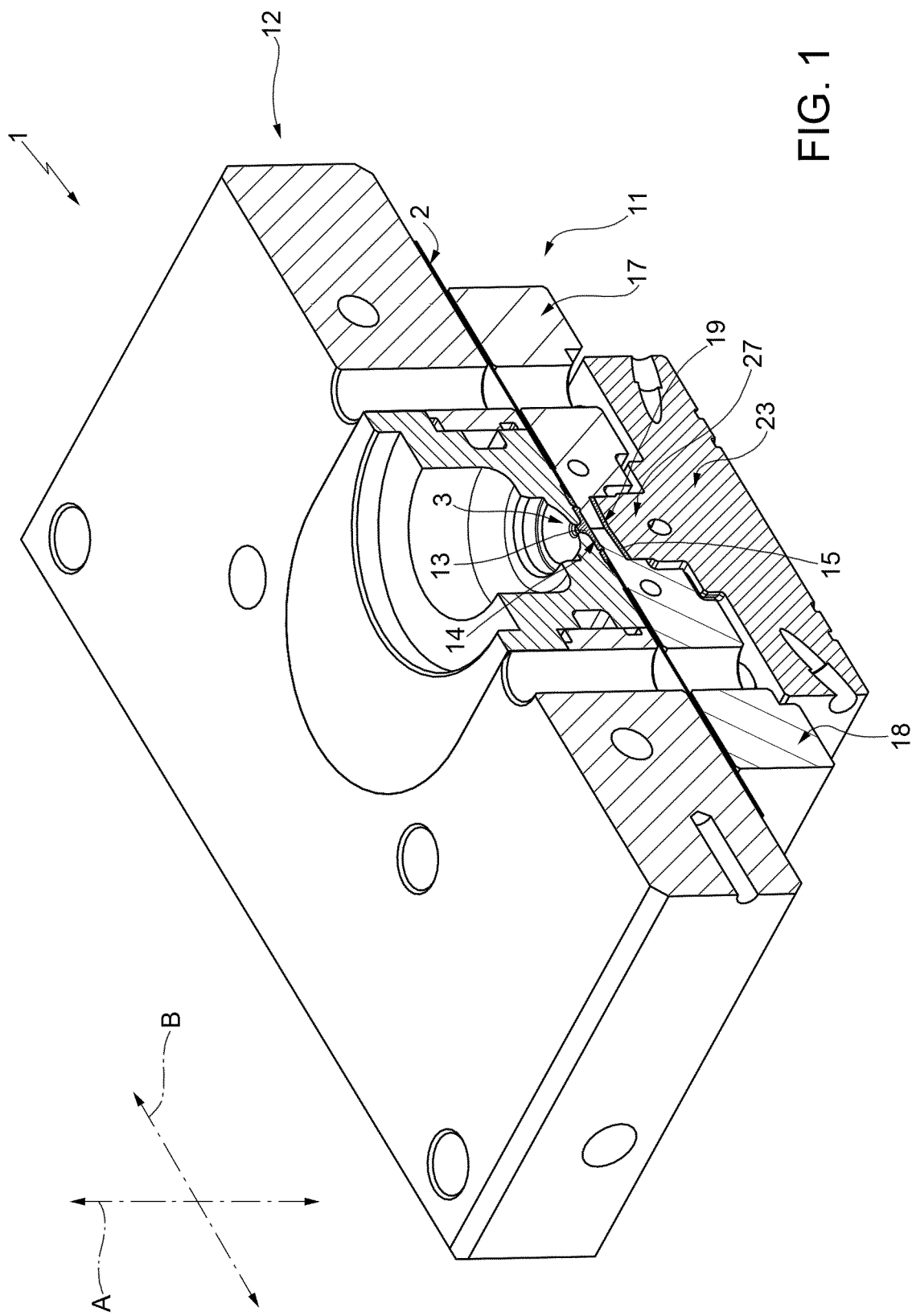
FIG. 1 is a perspective sectional view, with parts removed for clarity, of a molding apparatus according to the present invention and configured to injection mold an opening device on a sheet of packaging material.

With reference to FIG. 1, number 1 indicates as a whole a molding apparatus configured to injection mold an opening device 3 made of plastic material on a sheet 2 of packaging material adapted for packing a pourable product.

In particular, sheet 2 is configured to be formed, sealed and folded so as to obtain a respective package (not shown) adapted to contain a pourable food product, such as milk, water, fruit juice or the like.

Figure 6:
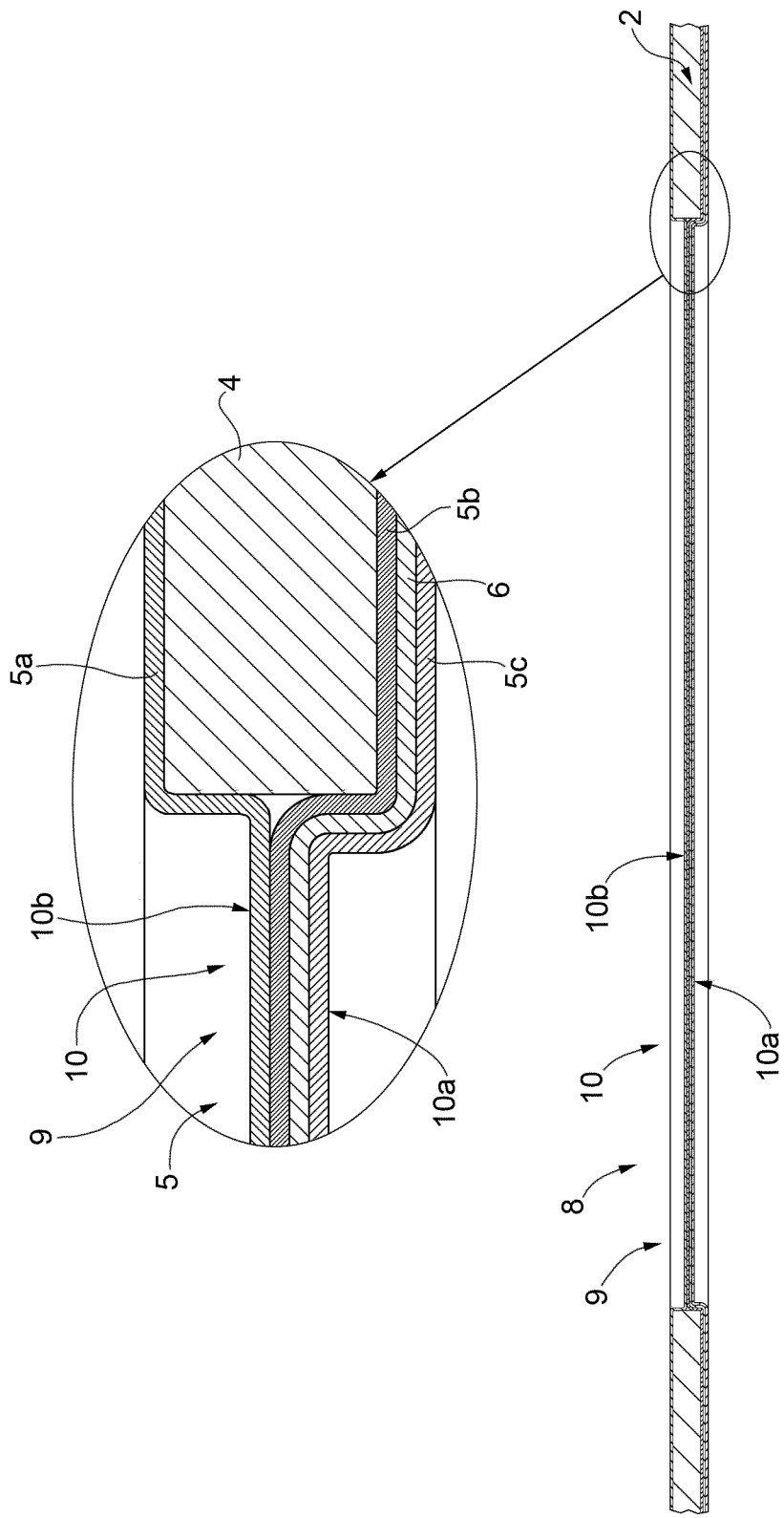
FIG. 6 is a schematic sectional view of the sheet of packaging material of FIG. 1.

With particular reference to FIG. 6, sheet 2 comprises a base layer 4 for providing stiffness and strength, which may be made of fibrous material, e.g. paper or mineral-filled polypropylene material, and a cover layer arrangement 5.

In detail, cover layer arrangement 5 comprises a first covering layer 5a and a second covering layer 5b, both made of heat-seal plastic material, e.g. polyethylene film, and covering both sides of base layer 4.

In the case of an aseptic package for long-storage food products, cover layer arrangement 5 also comprises a barrier layer 6 made of gas-barrier material, e.g. aluminum foil or ethyl vinyl alcohol (EVOH) film, which is superimposed on the second covering layer 5b and is in turn covered with a third covering layer 5c of cover layer arrangement 5, made of the same heat-seal plastic material of first covering layer 5a and second covering layer 5b.

In particular, third covering layer 5c forms the inner face of the package eventually containing the pourable food product.

In other words, first covering layer 5a, second covering layer 5b, barrier layer 6 and third covering layer 5c define lamination layers applied, by a lamination process, to base layer 4.

Sheet 2 further comprises a molding area 8 to which one respective opening device 3 is subsequently injection molded.

According to this non-limiting preferred embodiment shown, molding area 8 is defined by a removable portion, for example a so-called prelaminated hole 9, i.e. a through hole formed only through base layer 4 of sheet 2 and covered by cover layer arrangement 5, i.e. by first covering layer 5a, second covering layer 5b, barrier layer 6 and third covering layer 5c.

In particular, prelaminated hole 9 comprises a sheet cover portion 10 of opening device 3, which is made of the above-mentioned lamination layers and closes the through hole formed in base layer 4.

Preferably, sheet cover portion 10 is an integral part of cover layer arrangement 5.

In an alternative embodiment not shown, sheet cover portion 10 may be made of only one or more among first covering layer 5a, second covering layer 5b, barrier layer 6 and third covering layer 5c. For example, sheet cover portion 10 may be made solely of barrier layer 6.

In a further alternative embodiment not shown, molding area 8 may be defined by a through hole formed, in this case, through the full thickness of sheet 2, and covered by a patch defining sheet cover portion 10.

In an even further alternative embodiment not shown, molding area 8 may be defined by a through hole formed, in this case, through the full thickness of sheet 2; in this case, the molten plastic material forming opening device 3 covers directly the through hole.

Figure 5:
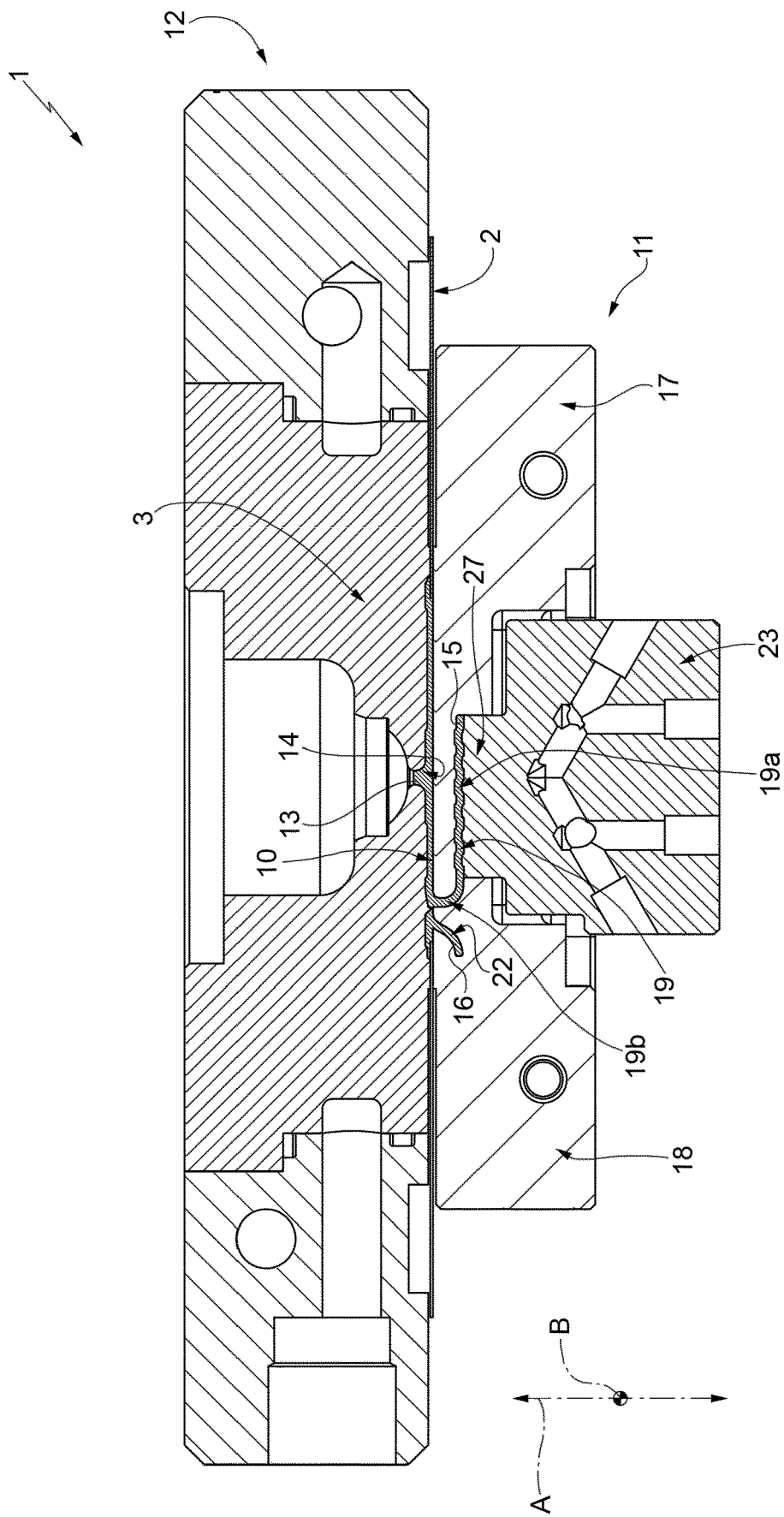
FIG. 5 is a further sectional side view, from another side and with parts removed for clarity, of the molding apparatus of FIG. 1.

In this non-limiting preferred embodiment shown, sheet cover portion 10 has a substantially elongated shape (FIG. 5).

As shown in FIGS. 1 to 5 molding apparatus 1 comprises a first molding unit 11 and a second molding unit 12, arranged in use on opposite sides of sheet 2 and configured to cooperate in contact with sheet 2, so as to injection mold a wall portion 13 of opening device 3 on a first side 10a of sheet cover portion 10. Preferably, first side 10a is the side of sheet cover portion 10 eventually facing towards the inner environment of the package containing the pourable food product.

In particular, wall portion 13 defines, together with sheet cover portion 10, a user-tearable portion of the package, configured to be torn by the user, in order to open the package.

Figure 2:
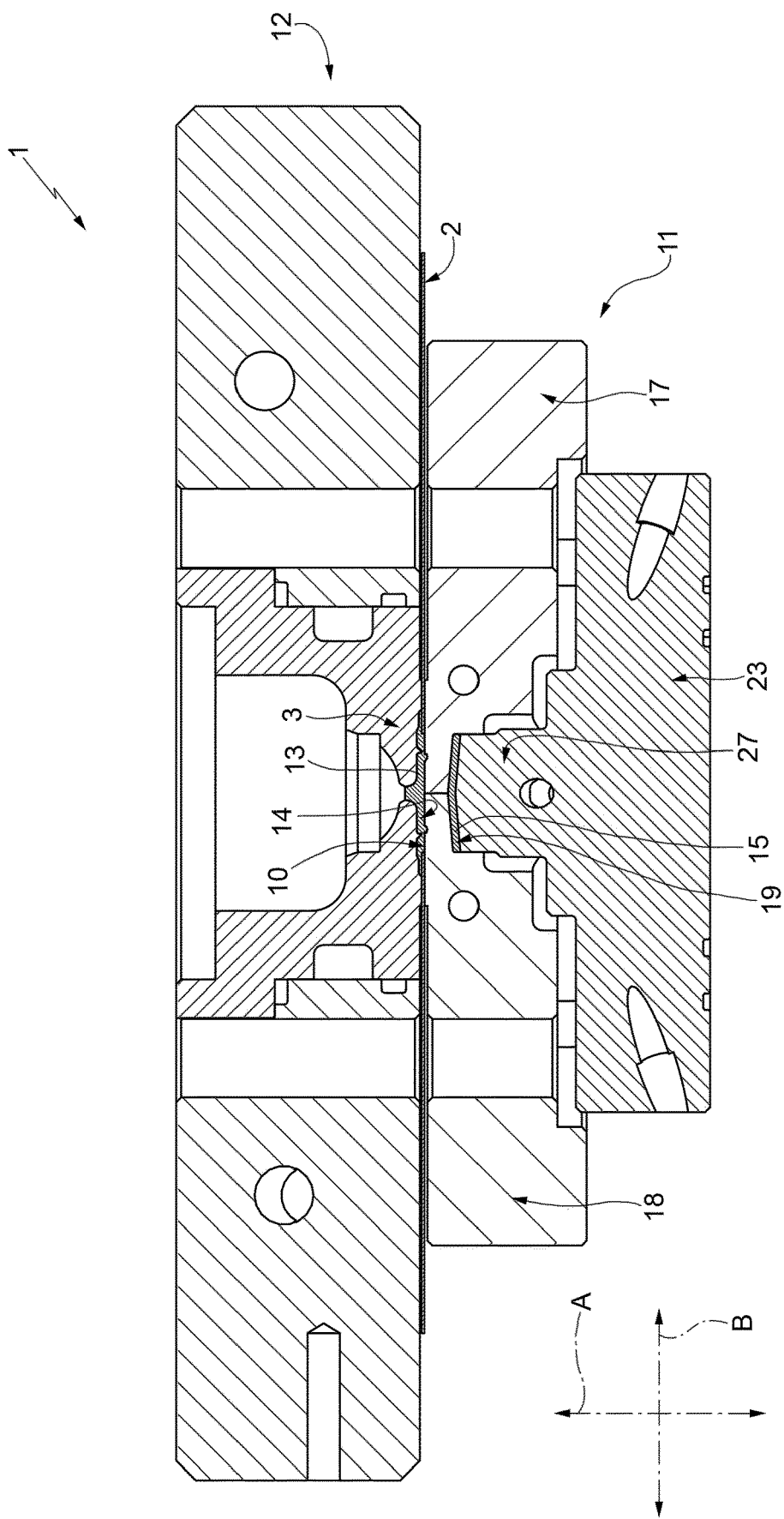
FIGS. 2 and 3 are larger-scale sectional side views of the molding apparatus of FIG. 1, in two different operating conditions.
Figure 3:
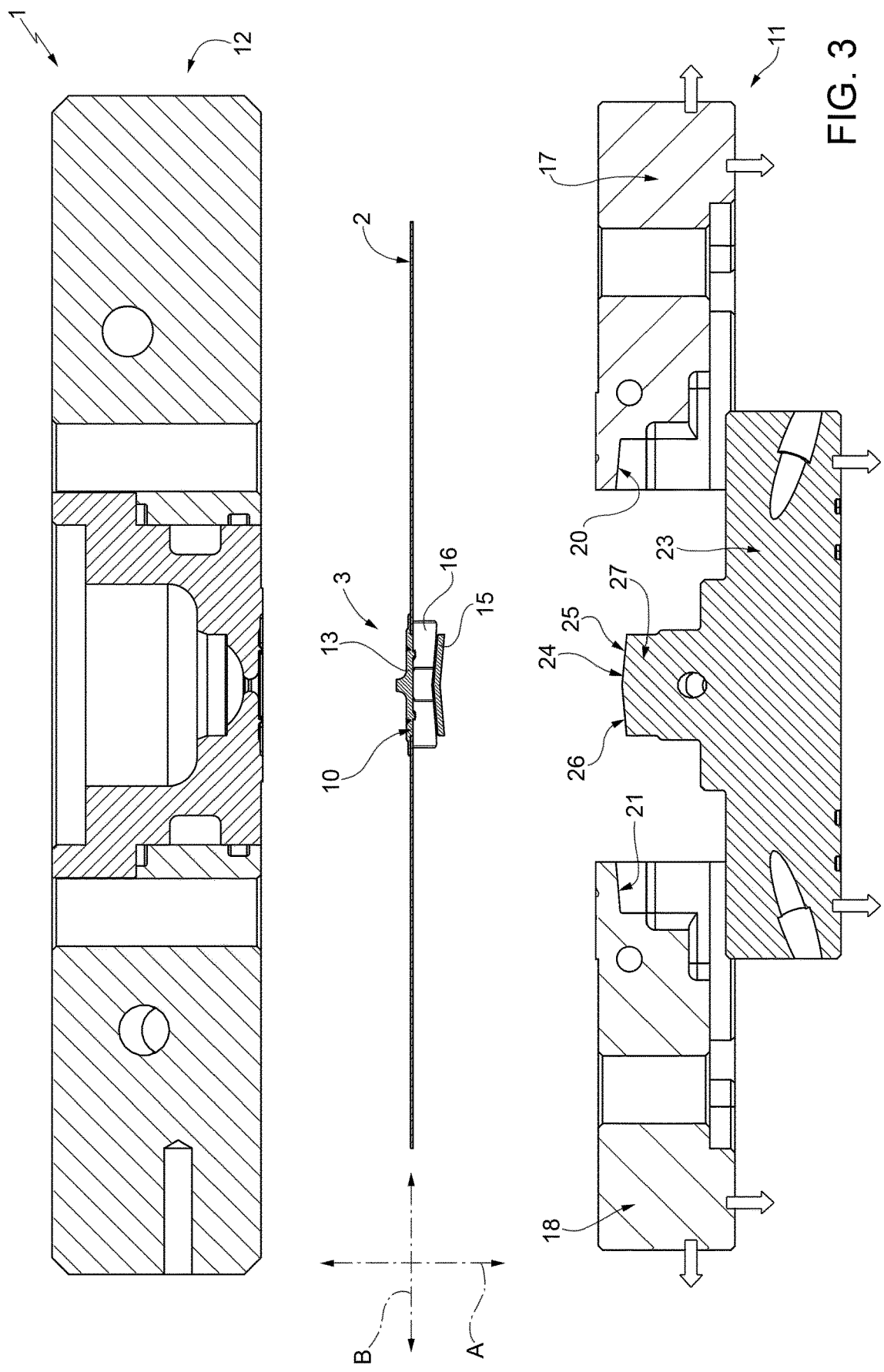

As shown in FIGS. 2 and 3 first molding unit 11 and second molding unit 12 are movable, with respect to one another, along a first direction A substantially orthogonal to sheet 2, between:
- a closed configuration, in which first molding unit 11 and second molding unit 12 cooperate in contact with sheet 2, so as to delimit a first mold cavity 14 housing molding area 8, i.e. sheet cover portion 10, and adapted to be filled with the molten plastic material (FIG. 2); and
- an open configuration, in which first molding unit 11 and second molding unit 12 are spaced apart from one another along direction A, having completed molding operation and allowing feed of another molding area 8, i.e. another sheet cover portion 10 (FIG. 3).

In detail, first mold cavity 14 is adapted to be filled with the molten plastic material for forming wall portion 13 of opening device 3.

In this way, wall portion 13 is injection molded on first side 10a of sheet cover portion 10.

As visible in FIGS. 1, 2, 4 and 5, during molding, i.e. when first molding unit 11 and second molding unit 12 are in the closed configuration, the injected plastic material is forced to pierce sheet cover portion 10 (due to the injection pressure and to the geometry of first mold cavity 14) at predetermined piercing areas, in order to form:
- a pull-member, preferably a pull-tab 15, protruding from a second side 10b of sheet cover portion 10, opposite to first side 10a, and designed to be pulled by the user, so as to cause a tearing of wall portion 13, and, therefore, of the user-tearable portion; and
- a pouring spout 16, also protruding from second side 10b and configured to guide the pourable product exiting from the package, once this latter is opened and emptied under the action of the user.

More specifically, sheet cover portion 10 is first pierced and then resealed by the molten plastic material. Moreover, pull-tab 15 and pouring spout 16 project integrally from wall portion 13 and, hence, are integrally formed in one single piece.

As visible in FIG. 5, pull-tab 15 has an elongated shape and comprises a curved portion, projecting transversally from wall portion 13, and a straight portion, extending from the curved portion above sheet cover portion 10.

In order to form pull-tab 15 and pouring spout 16, first molding unit 11 comprises a pair of semi-molds, in particular a first semi-mold 17 and a second semi-mold 18, which are arranged on opposite sides of first molding unit 11, preferably facing one another, with respect to a second direction B substantially parallel to sheet 2 and substantially orthogonal to direction A.

Furthermore, first semi-mold 17 and second semi-mold 18 are movable along direction B between:
- a closed position, in which first semi-mold 17 and second semi-mold 18 cooperate in contact, so as to delimit part of a second mold cavity 19 adapted to be filled with molten plastic material for forming pull-tab 15 (FIG. 2); and
- an open position, in which first semi-mold 17 and second semi-mold 18 are spaced apart from one another along direction B (FIG. 3).

In detail, second mold cavity 19 is delimited superiorly by first semi-mold 17 and second semi-mold 18.

Figure 4:
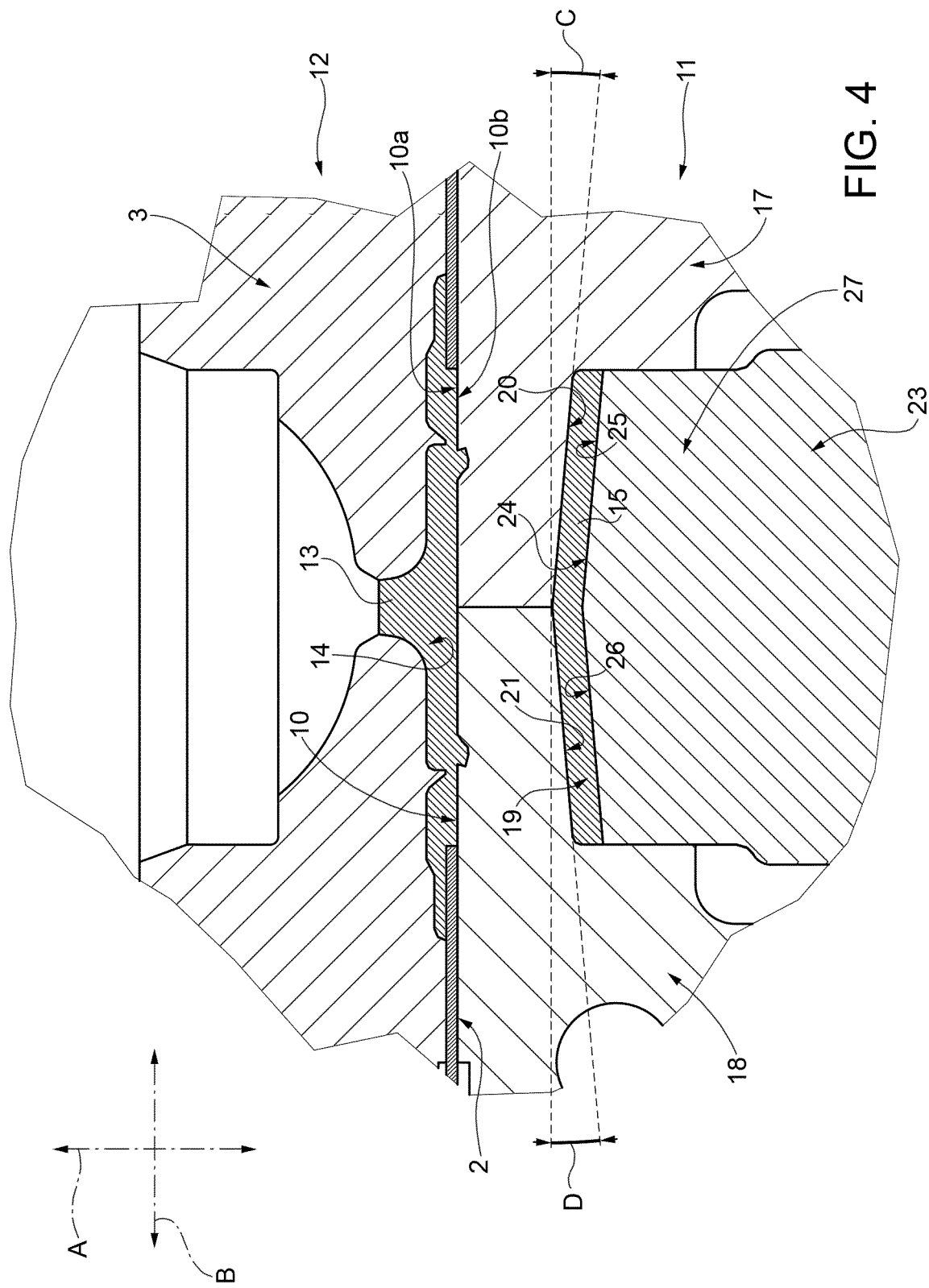
FIG. 4 shows, in a larger-scale and with parts removed for clarity, a detail of the molding apparatus of FIG. 2.

In greater detail, second mold cavity 19 is delimited superiorly by a first surface 20 defined by first semi-mold 17 and by a second surface 21 defined by second semi-mold 18 (FIG. 4).

Furthermore, first semi-mold 17 and second semi-mold 18 delimit, when being in the closed position, a third mold cavity 22 (visible in FIG. 5) adapted to be filled with the molten plastic material for forming pouring spout 16.

Advantageously, molding apparatus 1 further comprises a third molding unit 23, arranged in use between first semi-mold 17 and second semi-mold 18, with respect to direction B, and configured to move, along direction A, between:
- a first position, in which third molding unit 23 cooperates with first semi-mold 17 and second semi-mold 18, so as to delimit, together with first semi-mold 17 and second semi-mold 18, second mold cavity 19 (FIG. 2); and
- a second position, in which third molding unit 23 is spaced apart from first semi-mold 17 and second semi-mold 18 (FIG. 3).

In particular, third molding unit 23 comprises an upright extension portion 27, which extends integrally from third molding unit 23, along direction A and towards sheet 2, and is located in use between first semi-mold 17 and second semi-mold 18, with respect to direction B.

In detail, upright extension portion 27 defines a third surface 24 which, when first semi-mold 17 and second semi-mold 18 are in the closed position, faces both first surface 20 and second surface 21, thereby delimiting, together with first surface 20 and second surface 21, second mold cavity 19 (FIGS. 1, 2 and 4).

In greater detail, when first semi-mold 17 and second semi-mold 18 are in the closed position and third molding unit 23 is in the first position, third surface 24 faces first surface 20 and second surface 21, thereby delimiting inferiorly second mold cavity 19. At this point, second mold cavity 19 is fully defined and is ready to be filled with the molten plastic material for forming pull-tab 15, in particular the straight portion of pull-tab 15.

More specifically, the straight portion of pull-tab 15 is formed in a straight branch 19a of second mold cavity 19, whereas the curved portion of pull-tab 15 is formed in a curved branch 19b of second mold cavity 19.

In particular, as visible in FIG. 5, curved branch 19b is fluidically connected with straight branch 19a.

According to the operating technology of this non-limiting preferred embodiment shown, the relative movement of first molding unit 11 and second molding unit from the closed configuration to the open configuration, the movement of first semi-mold 17 and second semi-mold 18 from the closed position to the open position and the movement of third molding unit 23 from the first position to the second position occur during unmolding, i.e. once the injection of the plastic material into first mold cavity 15, second mold cavity 19 and third mold cavity 22 is completed, and the plastic material has cooled down enough to be removed from molding apparatus 1.

In particular, first semi-mold 17, second semi-mold 18, and third molding unit 23 have to be moved away (detached and separated) from the molded plastic material forming pull-tab 15 without compromising the integrity and the desired final shape of the latter.

For this purpose, as visible in FIG. 4, first surface 20 and second surface 21 are inclined with respect to direction B, by respective inclination angles C and D.

In particular, inclination angles C and D define respective so-called "draft angles", which provide for a minimum drag of first surface 20 and second surface 21 on the plastic material forming the straight portion of pull-tab 15, when first semi-mold 17 and second semi-mold 18 move, during unmolding, from the closed position to the open position.

In other words, the more inclined are first surface 20 and second surface 21, i.e. the greater is the width of inclination angles C and D, the less drag first surface 20 and second surface 21 exert in use on the superior surface of the straight portion of pull-tab 15, when first semi-mold 17 and second semi-mold 18 move towards the open position.

In this way, abrasion or removal of plastic material during unmolding is limited.

Furthermore, third surface 24 is shaped so as to be equidistant from first surface 20 and second surface 21, when first semi-mold 17 and second semi-mold 18 are in the closed position. Therefore, the thickness of second mold cavity 19 is constant.

In particular, third surface 24 comprises a first portion 25 parallel, in use, to first surface 20, and a second portion 26 parallel, in use, to second surface 21.

More specifically, first portion 25 is inclined of the same angle C first surface 20 is inclined of, with respect to direction B. Similarly, second portion 26 is inclined of the same angle D second surface 21 is inclined of, with respect to direction B.

In this way, the resulting thickness of the molded pull-tab 15 is constant and can be adjusted depending on how near upright extension portion 27, i.e. third surface 24, gets to first surface 20 and second surface 21, when third molding unit 23 moves in the first position.

In this particular example shown, inclination angles C and D are equal and opposite, with respect to direction B.

Therefore, first surface 20 and second surface 21 define, when first semi-mold 17 and second semi-mold 18 are in the closed position, an inverted V-shaped profile.

Similarly, third surface 24 has an inverted V-shaped profile.

In light of the above, second mold cavity 19 and, hence, pull-tab 15 have a substantially V-shaped cross-section, in particular an inverted V-shaped cross-section, symmetric with respect to direction A.

In detail, the respective width of inclination angles C and D are comprised between 1° and 15°, in greater detail between 2° and 10°.

According to an alternative embodiment not shown, first surface 20 and second surface 21 may have different inclination angles.

The operation of molding apparatus 1 is described hereinafter, starting from a condition in which first semi-mold 17 and second semi-mold 18 are in the closed position, third molding unit 23 is in the first position, and first molding unit 11 and second molding unit 12 are in the closed configuration.

In this condition, first molding cavity 14, second molding cavity 19 and third molding cavity 22 are defined and ready to receive the molten plastic material.

Once the injection is completed and the plastic material forming opening device 3 has cooled down enough, first molding unit 11 starts to move towards the open configuration, along direction A, detaching from second molding unit 12, which stands still.

In the meantime, first semi-mold 17 and second semi-mold 18 start to move apart from one another along direction B and towards the open position, moving away from pull-tab 15.

At the same time, third molding unit 23 moves from the first position to the second position.

At this point, opening device 3 is fully formed and injection molded on sheet cover portion 10 of sheet 2.

Once the operation is completed, another sheet 2 is fed between first molding unit 11 and second molding unit 12 and the operation is repeated cyclically.

The advantages of molding apparatus 1 according to the present invention will be clear from the foregoing description.

In particular, the presence of third molding unit 23 and the shape of third surface 24 permit to obtain a (reduced) constant thickness of the second mold cavity 19, and therefore of the straight portion of pull-tab 15, while maintaining sufficiently high inclination angles C and D.

More specifically, thanks to the above-described configuration of molding apparatus 1, inclination angles C and D are at least equal to the inclination angles of a molding apparatus which is not equipped with a third molding unit 23.

Hence, these features allow to avoid a high thickness portion of pull-tab 15, thereby minimizing the cooling time of the molten plastic material forming pull-tab 15, and reducing the overall costs.

At the same time, inclination angles C and D permit to perform a safe unmolding operation, limiting any abrasion or removal of plastic material.

Therefore, the effectiveness of the entire injection molding operation is improved, while preserving the effectiveness of the unmolding operation.

Clearly, changes may be made to molding apparatus 1 as described herein without, however, departing from the scope of protection as defined in the accompanying claims.

In particular, second mold cavity 19 may have a substantially rectangular cross-section.

In this last configuration, first surface 20 and second surface 21 would have zero inclination with respect to direction B (inclination angles C and D would have a size of) 0°, as well as third surface 24.

Consequently, first semi-mold 17 and second semi-mold 18 would have to move between the closed position and the open position along direction A, in order to avoid any drag with pull-tab 15 and, therefore, any abrasion or removal of the plastic material.

The invention claimed is:

1. A molding apparatus configured to injection mold an opening device on a molding area of a sheet of packaging material adapted for packing a pourable product; said molding apparatus comprising:
a first molding unit and a second molding unit, arranged in use on opposite sides of said sheet of packaging material and configured to cooperate in contact with said sheet of packaging material, so as to injection mold a wall portion of said opening device on said sheet of packaging material at said molding area;
said first molding unit comprising, in turn, a first molding element and a second molding element, which are movable between:
a closed position, in which said first molding element and said second molding element cooperate in contact, so as to delimit at least part of a mold cavity adapted to be filled with molten material for forming a pull-member of said opening device designed to be pulled, in use, for tearing said wall portion; and
an open position, in which said first molding element and said second molding element are spaced apart from one another;
said mold cavity being delimited at least by a first surface defined by said first molding element and a second surface defined by said second molding element;

a third molding unit configured to cooperate with said first molding element and said second molding element, so as to delimit, together with said first molding element and said second molding element, said mold cavity;

said third molding unit defining a third surface, which, when said first molding element and said second molding element are in said closed position, is directly below said first surface and said second surface, thereby delimiting, together with said first surface and said second surface, said mold cavity; and said third surface being shaped so as to be equidistant from said first surface and said second surface, when said first molding element and said second molding element are in said closed position.

2. The molding apparatus as claimed in claim 1, wherein said third molding unit is configured to move between:
   a first position, in which said third molding unit cooperates with said first molding element and said second molding element, so as to delimit, together with said first molding element and said second molding element, said mold cavity; and
   a second position, in which said third molding unit is spaced apart from said first molding element and said second molding element.

3. The molding apparatus as claimed in claim 2, wherein said third molding unit is configured to move between said first position and said second position along a first direction substantially orthogonal to said sheet of packaging material.

4. The molding apparatus as claimed in claim 3, wherein said first molding element and said second molding element are arranged on opposite sides of said first molding unit, with respect to a second direction substantially parallel to said sheet of packaging material and substantially orthogonal to said first direction, and are movable between said closed position and said open position along said second direction;
   and wherein said first surface and said second surface are inclined with respect to said second direction, of respective inclination angles.

5. The molding apparatus as claimed in claim 4, wherein said first surface and said second surface are inclined of respective equal and opposite inclination angles, with respect to said second direction.

6. The molding apparatus as claimed in claim 4, wherein said first surface and said second surface are inclined at respective inclination angles greater than 1°, with respect to said direction.

7. The molding apparatus as claimed in claim 6, wherein said first surface and said second surface are inclined at respective inclination angles greater than 2°, with respect to said second direction.

8. The molding apparatus as claimed in claim 7, wherein said first surface and said second surface are inclined at of respective inclination angles, with respect to said second direction, which range between 2° and 15°.

9. The molding apparatus as claimed in claim 8, wherein said first surface and said second surface are inclined at respective inclination angles, with respect to said second direction, which range between 2° and 10°.

10. The molding apparatus as claimed in claim 4, wherein said third molding unit is arranged in use between said first molding element and said second molding element, with respect to said second direction.

11. The molding apparatus as claimed in claim 1, wherein said third surface comprises a first portion, parallel, in use, to said first surface, and a second portion, parallel, in use, to said second surface.

12. The molding apparatus as claimed in claim 1, wherein said mold cavity has a constant thickness.

13. The molding apparatus as claimed in claim 1, wherein said mold cavity has a substantially V-shaped cross-section.

14. The molding apparatus as claimed in claim 1, wherein said first molding unit and said second molding unit are movable, with respect to one another, between:
   a closed configuration, in which said first molding unit and said second molding unit cooperate in contact with said sheet of packaging material, so as to delimit at least one further mold cavity housing said molding area and adapted to be filled with molten material for forming said wall portion of said opening device; and
   an open configuration, in which said first molding unit and said second molding unit are spaced apart from one another.

15. The molding apparatus as claimed in claim 1, wherein said sheet of packaging material comprises at least a first layer and a second layer; said molding area being defined by at least one through hole covered by a sheet cover portion;
   said through hole being formed through said first layer only and being covered by said sheet cover portion of said second layer.

\* \* \* \* \*